United States Patent
Stern et al.

(10) Patent No.: US 8,190,878 B2
(45) Date of Patent: May 29, 2012

(54) IMPLEMENTATION OF PRIVATE MESSAGING

(75) Inventors: Pablo M. Stern, San Francisco, CA (US); Arnold N. Blinn, Hunts Point, WA (US)

(73) Assignee: Microsoft Corporation, Redmond, WA (US)

( * ) Notice: Subject to any disclaimer, the term of this patent is extended or adjusted under 35 U.S.C. 154(b) by 1075 days.

(21) Appl. No.: 11/690,760

(22) Filed: Mar. 23, 2007

(65) Prior Publication Data
US 2008/0235336 A1 Sep. 25, 2008

(51) Int. Cl.
*H04L 29/06* (2006.01)
(52) U.S. Cl. .................................................. 713/153
(58) Field of Classification Search .................. 713/150, 713/153
See application file for complete search history.

(56) References Cited

U.S. PATENT DOCUMENTS

| | | | |
|---|---|---|---|
| 5,768,391 A | 6/1998 | Ichikawa | |
| 5,812,670 A | 9/1998 | Micali | |
| 5,872,925 A * | 2/1999 | Han | 709/206 |
| 6,230,188 B1 | 5/2001 | Marcus | |
| 6,643,687 B1 | 11/2003 | Dickie et al. | |
| 6,678,663 B1 | 1/2004 | Mayo | |
| 6,851,049 B1 | 2/2005 | Price, III | |
| 7,120,796 B2 | 10/2006 | DiSanto et al. | |
| 7,328,351 B2 * | 2/2008 | Yokota et al. | 713/189 |
| 2003/0177189 A1 * | 9/2003 | Tomono | 709/206 |
| 2004/0148358 A1 | 7/2004 | Singh et al. | |
| 2005/0201536 A1 | 9/2005 | LaLonde et al. | |
| 2005/0235041 A1 | 10/2005 | Salamuniccar | |
| 2006/0045068 A1 | 3/2006 | Wu et al. | |
| 2007/0060328 A1 * | 3/2007 | Zrike et al. | 463/29 |
| 2007/0299920 A1 * | 12/2007 | Crespo et al. | 709/206 |

FOREIGN PATENT DOCUMENTS

| | | | |
|---|---|---|---|
| JP | 2002135334 A | 5/2002 | |
| KR | 20040082155 A | 9/2004 | |
| WO | WO 0065505 A2 * | 11/2000 | |
| WO | 03053017 A1 | 6/2003 | |

OTHER PUBLICATIONS

Danezis, George, "Better Anonymous Communications", University of Cambridge, Computer Laboratory, 2004.*
International Search Report and Written Opinion dated Jul. 9, 2008 in PCT Application No. PCT/US2008/053196.
Privacy Preserving Web-Based Email http://ftp.cse.psu.edu/~enck/pubs/iciss06b.pdf, 2006.
A Flexible Role-based Secure Messaging Service: Exploiting IBE Technology in a Health Care Trial http://www.hwswworld.com/downloads/9_13_05_a_pdfs/HPL-2003-21.pdf.
Onion Routing for Anonymous and Private Internet Connections www.onion-router.net/Publications/CACM-1999.pdf.
Untraceable Electronic Mail, Return Addresses, and Digital Pseudonyms http://freehaven.net/anonbib/cache/chaum-mix.pdf.

* cited by examiner

*Primary Examiner* — Michael S McNally
(74) *Attorney, Agent, or Firm* — Vierra Magen Marcus & DeNiro LLP

(57) ABSTRACT

A method is disclosed for sending messages such as emails where the sender and receiver in the exchange remain anonymous to each other. The method uses a service, which may for example be an Internet service provider, which acts as an intermediary between a first party and second party to a message. All exchanges between the first and second parties pass through the service, which masks all true identities while ensuring that the message is routed to the proper recipient(s).

16 Claims, 8 Drawing Sheets

Fig. 7
```
MessageID:[localpart][R][MAC][RH][TH][V]@[domainname]>
```
For example:
```
Message-ID: <local-1D249E2AD925B19CE14F29DA40@somename.com>
```
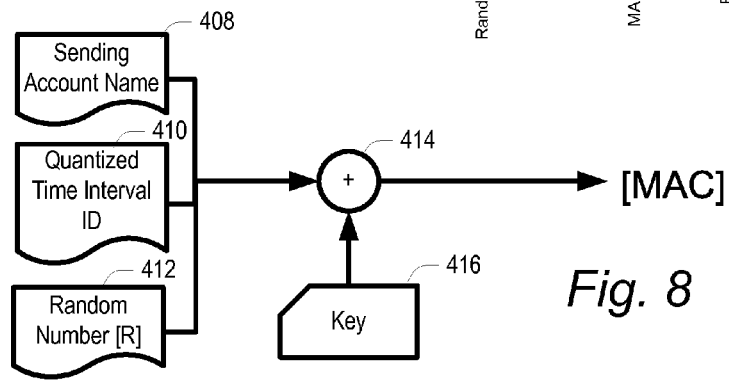
Fig. 8
Fig. 9
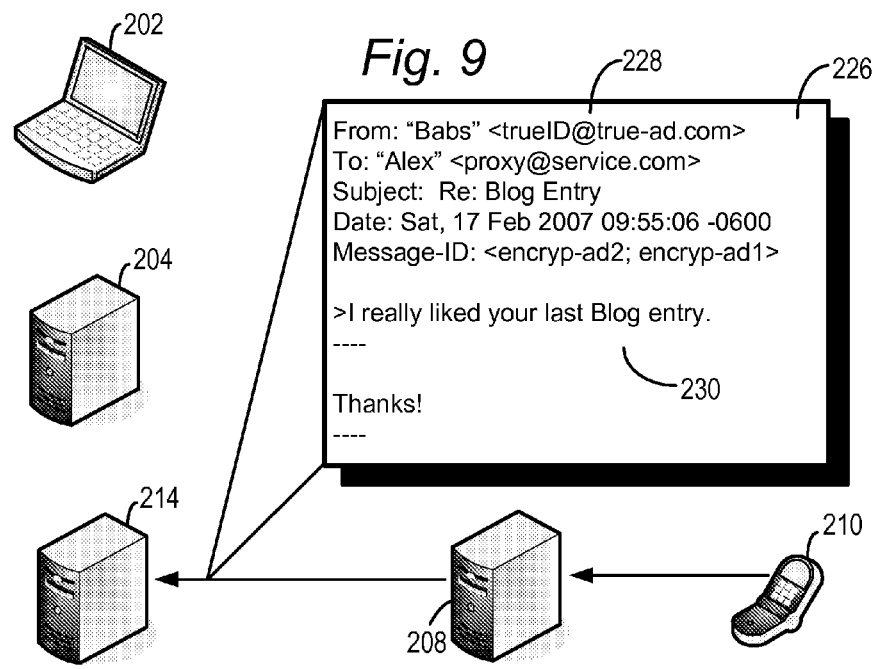

IMPLEMENTATION OF PRIVATE MESSAGING

BACKGROUND

With the ubiquity of the Internet and computer networks, electronic mail (email) is rapidly becoming the preferred method of communicating textual, graphical and other digital information. Unlike conventional postal mail, email may arrive at its destination within seconds or minutes of its sending, even where the recipient is across the globe. Moreover, an email may be easily sent to multiple recipients. Most enterprise service providers now support an email application program providing email accounts for its subscribers.

A conventional email system operates using a mail user agent, or MUA, which is a software application program used to send and receive emails. Examples include Outlook® messaging and collaboration client and Hotmail® web-based e-mail service by Microsoft Corporation, Redmond, Wash. An email includes a body with the email message, and a header having information such as "From" followed by a sender name, "To" followed by a recipient name, the message subject and a date stamp. The header may also include a sender email address and a recipient email address. An email address consists of a username followed by the "@" sign, followed by a domain name. The "To" and "From" names may or may not be the same as the sender email address and recipient email address. The email addresses are used for delivery of an email to its intended recipient(s).

Referring to FIG. 1, once an email sender creates an email using an MUA 20 listing one or more recipients, the MUA formats the message, including sender and recipient information, using the Simple Mail Transfer Protocol (SMTP) and sends the message to a local mail transfer agent (MTA) 22. The MTA 22 is a software agent, running on a mail exchange server of the sender's ISP, used to transfer email from the sender's MUA 20 to one or more recipients using the email address in the header. The MTA 22 contacts a domain name server (DNS) 24 for the domain listed in a recipient email address to find the mail exchange server(s) accepting messages for the domain specified in the email address.

The DNS 24 responds with a mail exchanger record (MX) listing the mail exchange server 26 for that domain. The MTA 22 may then send the message using SMTP to MTA 28 running on a mail exchange server of the recipient's ISP. The MTA 28 may then deliver the message to the recipient's mailbox on recipient's MUA 30 using for example the Post Office Protocol (POP3). Instead of traveling directly from the sender's mail server to the recipient's mail server, the message may travel through a number of intermediate mail servers. In addition to the sending and receiving IP addresses, the IP address of any mail server through which the message passes is also embedded in the header.

When sending or exchanging emails, there are instances where two or more parties may wish to communicate anonymously. Such instances may include business transactions or social exchanges where the parties may or may not know each other, but both parties wish to keep their real email address anonymous during the sending and/or exchange of messages. Moreover, one or more of the email participants may wish to place restrictions on the exchange, such as for example blocking emails from certain participants and limiting the number of emails which may be received from one or more participants.

SUMMARY

The present system, roughly described, pertains to a system for sending messages where the sender and receiver in the exchange remain anonymous to each other. In embodiments, messages are sent using email. However, it is understood that messages sent by a variety of other systems are contemplated, such as for example, short message service (SMS) and Multimedia messaging service (MMS).

In embodiments, the present system includes a service, which may for example be an Internet service provider, which acts as an intermediary between a first party and second party that wish to exchange anonymous emails. A first party initiates a private email session by accepting an invitation of a second party to send a private email. The second party may for example extend this invitation from the second party's webpage, which may include a private message invitation link. The second party may set up the private message invitation link after subscribing to the private message service.

Once the first party initiates a private message session, the first party's MUA provides a user interface for completing and sending an email. The "From" and "To" lines may be populated with aliases for the first party sender and second party recipient, as well as proxy email addresses for each. The proxy email addresses are addresses within the service ensuring that the email is routed to the service. In one embodiment, the email header may further include the encrypted email addresses of the first and second parties.

Upon receipt of the email, the service may decrypt the second party recipient's email address included in the header. The service may then replace the proxy email address in the envelope recipient. This is the address to which the email is sent. Prior to forwarding the email to the recipient, the service checks whether the "From" line includes a proxy or true email address of the sender. Where the "From" line includes the first party sender's real email address, the service encrypts the sender's email address. The service may then replace the sender's true email address with the service's proxy email address and the sender's encrypted email address may be included in the header. The service may then send the email to the recipient.

The same process may be implemented in reverse for reply emails from the second party back to the first party. The reply email is routed through the service, which decrypts the first party recipient's email and uses the decrypted email in the email envelope. The service may also replace the second party's real email with a proxy email before the email is forwarded to the first party from the service.

This process may be repeated as desired by the sender and recipient, subject to any metadata restrictions placed on the exchange as described hereinafter. The same process may also be used with multiple email recipients. As long as the email exchanges go through the service, all participant identities will remain obscured.

In a further embodiment, instead of encryption, the service may use a database look-up table which stores real email addresses of subscribers, together with a proxy username email address for each subscriber. When a private message is sent between a first party and a second party, the service uses the look-up table to replace proxy username email addresses in the envelope when forwarding messages to a recipient, and also to ensure that all real email addresses are replaced by the proxy username email addresses prior to forwarding the messages.

In a still further embodiment, a subscriber to the service may set certain preferences which are then reflected in the metadata associated with a header in an email. Such preferences may include preventing emails from one or more individuals, limiting the length of time within which a sender must contact the recipient, limiting the number of emails which may be sent from one, some or all users to the recipient, and limiting the type of content which may be included in the body of an email to the recipient.

BRIEF DESCRIPTION OF THE DRAWINGS

FIG. 7 is an example of an encrypted email address formed in accordance with the present system.

FIG. 8 is a block diagram of a method for creating the encrypted email addresses of FIG. 7.

FIG. 9 is a block diagram of a reply email being routed from the original recipient back to the service according to the present system.

DETAILED DESCRIPTION

Figure 1:
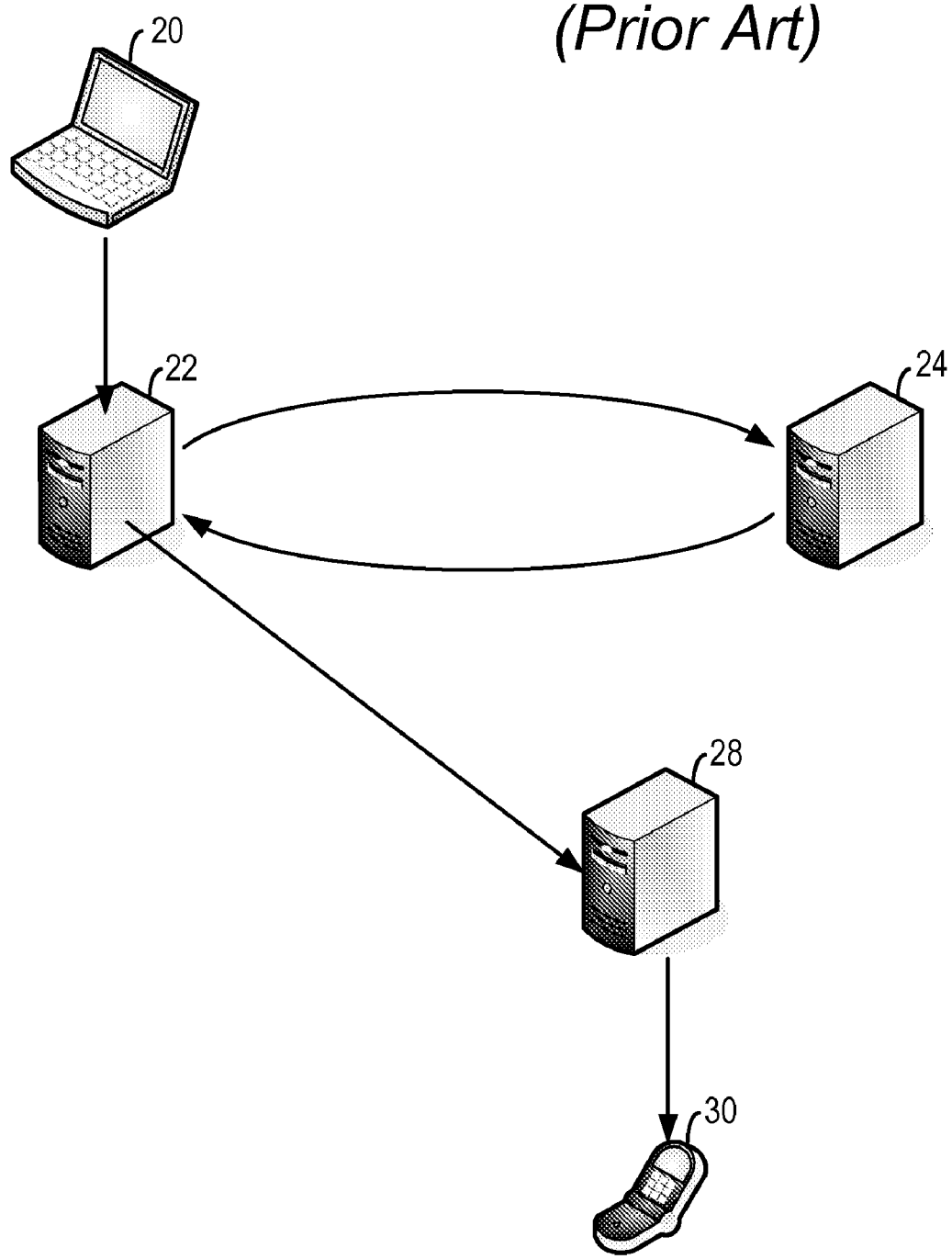
FIG. 1 depicts a block diagram of computer hardware suitable for implementing the system.
Figure 2:
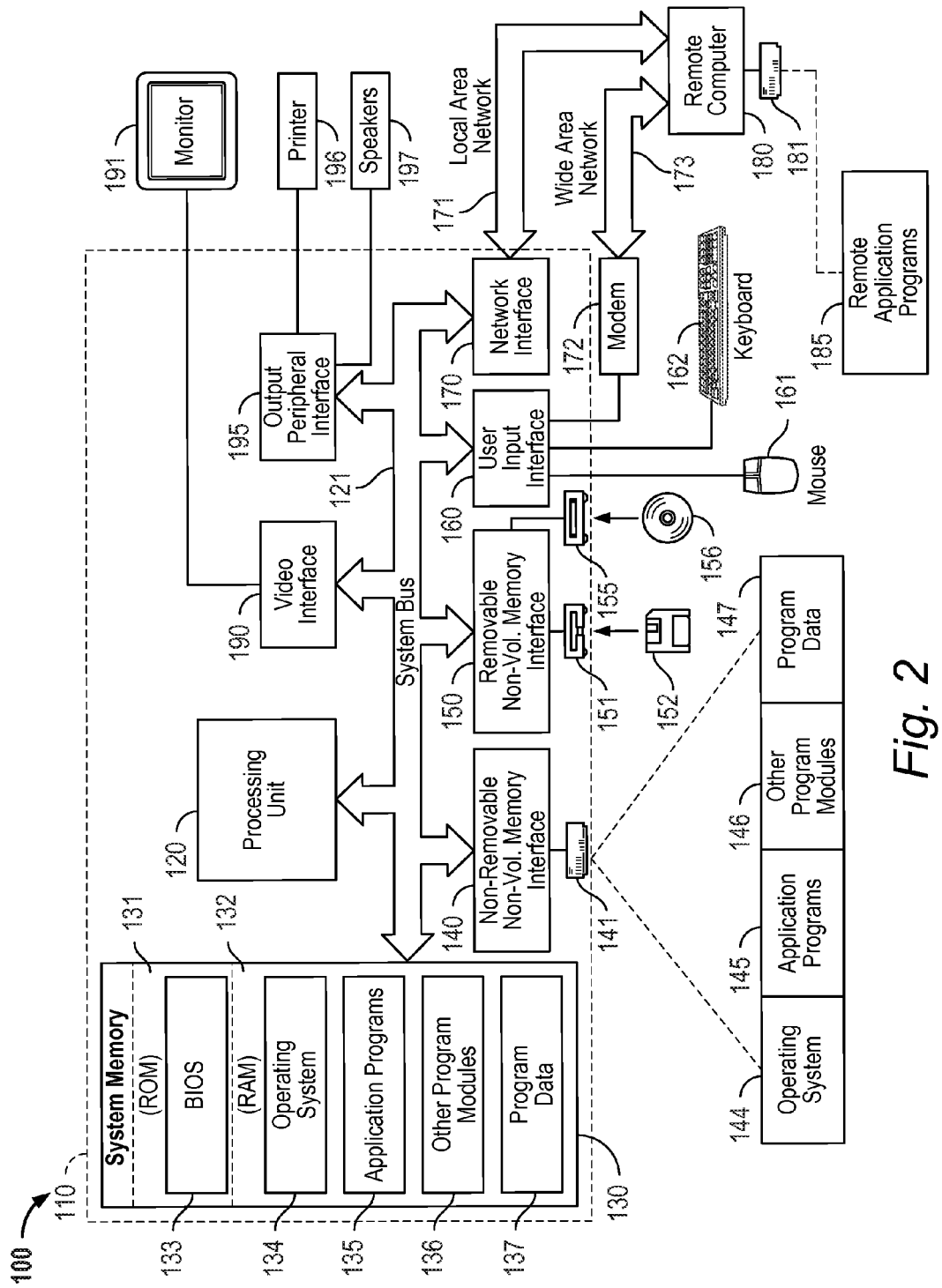
FIG. 2 is a block diagram of a conventional method for generating an email message.

The system provides a system and method for sending messages where the sender and receiver in the exchange remain anonymous to each other. FIG. 1 illustrates an example of a suitable general computing system environment 100 on which the system may be implemented. The computing system environment 100 is only one example of a suitable computing environment and is not intended to suggest any limitation as to the scope of use or functionality of the system. Neither should the computing environment 100 be interpreted as having any dependency or requirement relating to any one or combination of components illustrated in the exemplary operating environment 100.

The system is operational with numerous other general purpose or special purpose computing system environments or configurations. Examples of well known computing systems, environments, and/or configurations that may be suitable for use with the system include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The system may be described in the general context of computer-executable instructions, such as program modules, being executed by a computer. Generally, program modules include routines, programs, objects, components, data structures, etc., that perform particular tasks or implement particular abstract data types. The system may also be practiced in distributed computing environments where tasks are performed by remote processing devices that are linked through a communications network. In a distributed computing environment, program modules may be located in both local and remote computer storage media including memory storage devices.

FIG. 1, an exemplary computing environment for implementing the present system, includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are also included within the scope of computer readable media.

The system memory 130 includes computer storage media in the form of volatile and/or nonvolatile memory such as read only memory (ROM) 131 and random access memory (RAM) 132. A basic input/output system (BIOS) 133, containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD-ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. These components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computer 110 may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The present system addresses the problem of maintaining the anonymity of a sender and recipient, both in the initial message from sender to recipient, as well as subsequent replies and exchanges. Aspects of the present system further relate to including metadata in an email message defining characteristics such as who can receive/reply to the message and how many exchanges are allowed. These features are explained below. In the examples described hereinafter, each messaging system is described as an email system. However, it should be recognized that the messaging systems which would benefit from the present system are not limited to email systems alone. For example, any messaging system capable of providing a latent identification field for use in accordance with the instant description may be used in accordance with the present system, such as, for example, short message service (SMS) and Multimedia messaging service (MMS).

The following description relates to sent messages and reply messages. These messages are for example described in IETF Request For Comments (RFC) 822 entitled "Standard for the Format of ARPA Internet Text Messages" and RFC 2822 entitled "Internet Message Format". These standards specify syntax for text messages that are sent between computer users within the framework of email messages. RFC 2822 supersedes RFC 822, updating it to reflect current practice and incorporating incremental changes that were specified in other RFCs. These standards are incorporated by reference herein in their entirety.

Figure 3:
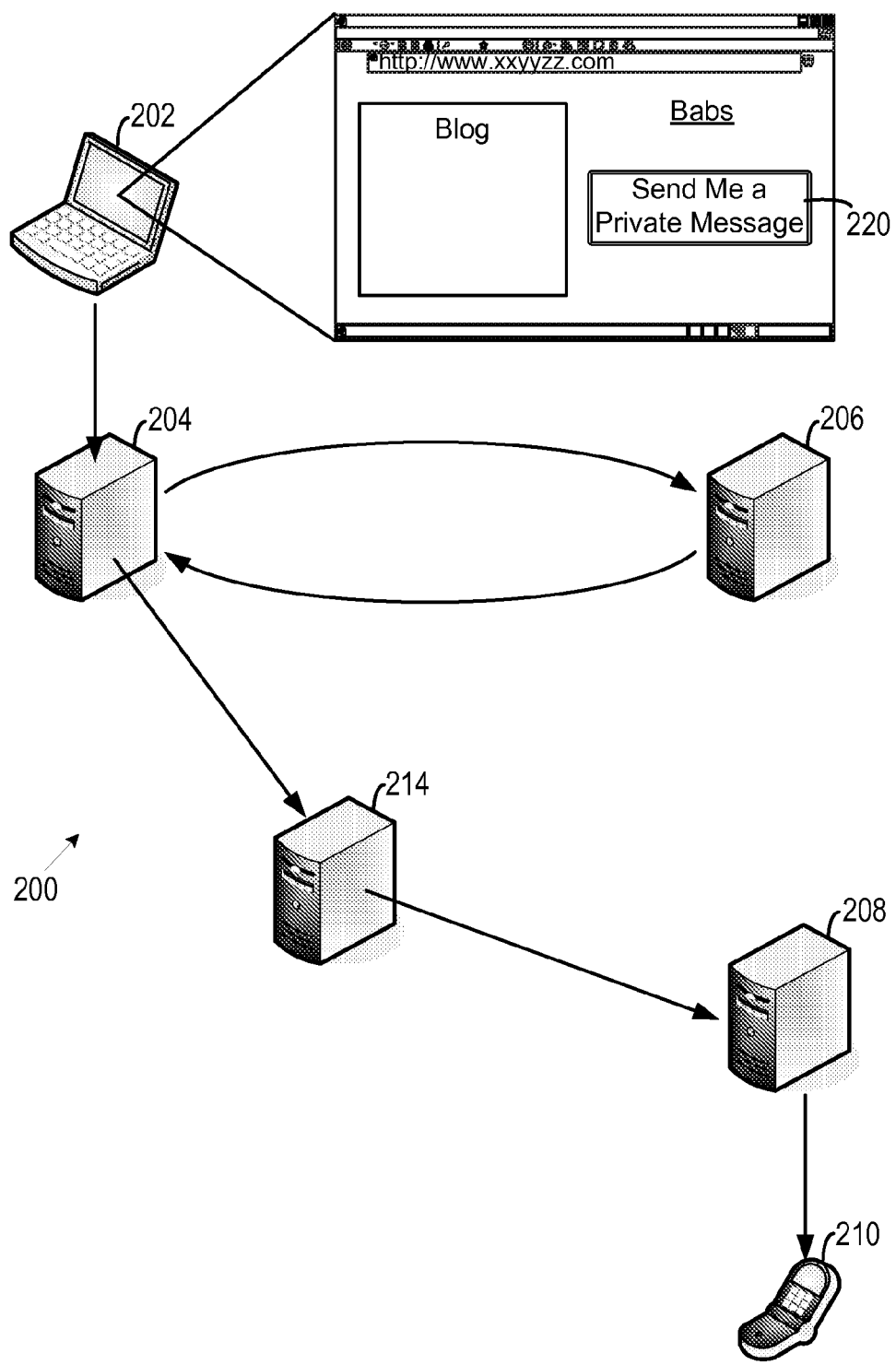
FIG. 3 is a block diagram of a method for generating an email message in accordance with the present system.

FIG. 3 is a block diagram illustrating a system 200 according to the present system. The system 200 includes certain components found in conventional systems as described above. For example, the system 200 may include an MUA 202 on a first party sender's computing environment used by a sender to generate emails, an MTA 204 at the sender's email exchange server for obtaining destination information and forwarding emails from MUA 202 for delivery, and a DSN server 206 for replying to destination requests by MTA 204 with an MX listing the destination mail server for email messages. The system 200 may further include MTA 208 at the second party recipient's email exchange server, and an MUA 210 at a recipient's computing environment used by a recipient to receive, reply and generate emails. In embodiments, each of these components may be of known configuration. In the embodiment shown, the sender MUA 202 and recipient MUA 210 are shown in the figures running on a laptop computer and a cellular telephone, respectively. It is understood that MUA 202 and MUA 210 may run on any of the above-described computing systems or environments.

In accordance with the present system, system 200 may further include a service 214 to which emails between the sender and recipient are directed during transmission. Service 214 masks the identity of the sender and recipient provided in email headers as explained hereinafter to protect the anonymity of the email participants. In embodiments, service 214 may for example be an Internet service provider, but may alternatively be a computing environment networked to the computing systems of the sender and recipient, as for example over the Internet, LAN or other network. Service 214 may include one or more computing system environments, such as environment 100 described above, and may include software application programs and/or hardware for masking email identity as explained hereinafter.

Service 214 may mask sender and recipient identity according to different embodiments. In a first embodiment, the identity of the sender and recipient may be encrypted within the header of email exchanges. In a second embodiment, the identity of the sender and recipient may be stripped from an email header and replaced with a proxy email address, with the correlation between true ID and proxy ID maintained in a database within service 214. Each of these embodiments is described hereinafter. It is understood that the two embodiments may be combined and used together.

Figure 4A:
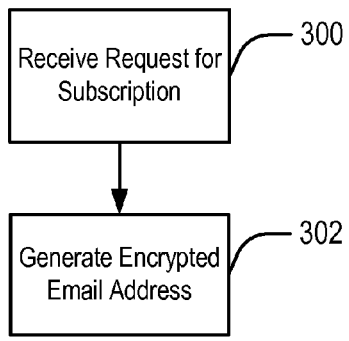
FIG. 4A is a flowchart illustrating initial subscription to a service according to the present system.

An encrypted embodiment of the present system will now be described with reference to the flowcharts of FIGS. 4A and 4B and the block diagrams of FIGS. 3 and 5. Referring initially to FIG. 4A, where an individual wishes to use the private messaging system, the service 214 receives a request for a subscription in step 300 and generates an encrypted email address for the individual in step 302. The encrypted email address for the subscriber may alternatively be generated upon sending of an email for or to the subscriber as explained below. One method for generating the encrypted email address is explained hereinafter with respect to FIGS. 7 and 8.

After an individual subscribes, the subscriber may invite others to send them private messages over a network. Those of skill in the art will appreciate a variety of invitation schemes. For example, as shown in FIG. 3, a subscriber may post an invitation link on their webpage, such as for example on MSN Spaces or other hosted webpages. The webpage may be hosted by the service 214 or by a service provider unrelated to service 214. In order to generate a private message from the invitation, an alias for the subscriber, and an encrypted email for the subscriber, may be stored in association with the hyperlink invitation. The alias may be selected by the subscriber as the name that is to appear in the "To" line of private messages they receive. Moreover, where the private message invitation is provided on a webpage not associated with the service 214, the location (email address) of the service 214 may also be stored in association with the hyperlink 220.

Figure 5:
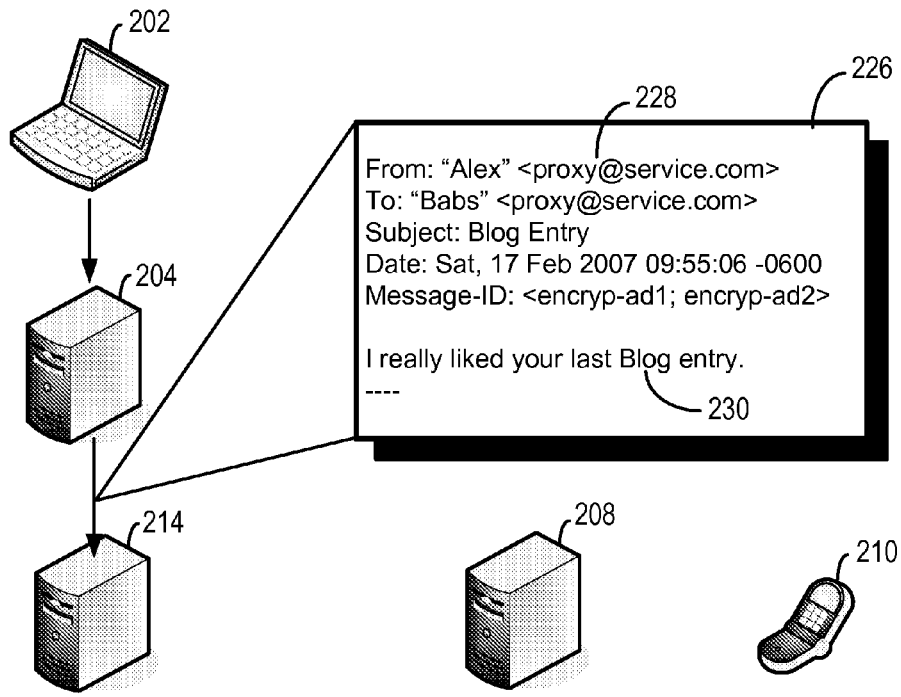
FIG. 5 is a block diagram of an email being routed from a sender to the service according to an encrypted embodiment of the present system.

When a visitor to the subscriber's site selects the private message invitation to send a private message, the sender's MUA may present a user interface 226, as shown for example in FIG. 5, for the sender to create and send a private email to the subscribing recipient. The user interface 226 may appear as a conventional interface for creating and sending emails, and may include a header 228 populated as explained hereinafter, and a body 230 including the message the sender wishes to send.

Within the header, the "To" line may be populated with the alias associated with the recipient. In the example of FIG. 5, the recipient has selected the alias "Babs." The alias is followed by the proxy email address of service 214 also stored in association with the invitation link.

The recipient's encrypted email may also be provided within the header 228 of the email. In embodiments, the encrypted email address may for example be included as part of the message ID (i.e., "encrypt-ad1" in FIG. 5). As the message ID is typically included in any subsequent email replies and exchanges, inclusion of the recipient's encrypted email address as part of the message ID ensures that the encrypted email address is persisted between all emails and replies. It is understood that the recipient's encrypted email address may be included elsewhere in the header, or even outside of the header in alternative embodiments. For example, the encrypted sender and/or recipient email addresses may be provided in the "From" and/or "To" portion of the header instead of, or in addition to, the proxy email address. In a further embodiment, the encrypted email address for the sender and/or recipient may be included as part of the PUIDS, SIDS, or elsewhere.

The "From" line of the email may include an alias selected by the sender, "Alex" in this example. The alias is followed by an email address. The contents of the email address, and whether an encrypted email address for the sender is included, may vary depending on a few factors. As indicated above, the sender may initiate a private message from a website hosted by the service 214 or from a site not associated with the service 214. In embodiments where the sender is generating the private message while logged onto a web site hosted by service 214, the email address following the sender's alias may simply be a proxy email address of the service 214. This is the example shown in FIG. 5. However, it may also happen that the sender has accepted an invitation to send a private message while on a web site not associated with service 214. In such an embodiment, the sender's true email address may appear in the "From" line.

Additionally, the contents of the header 228 may depend on whether the sender has subscribed to the service or not. Where the sender has subscribed to the private messaging service and received an encrypted email address, the sender's encrypted email address may also be included as part of the header, such as for example in the message ID. This is the example shown in FIG. 5 (i.e., "encrypt-ad2"). The encrypted email of the sender may be included in the message header where the sender is logged onto the service 214 when sending the private message. Alternatively or additionally, the sender's MUA 202 may have an option to include the sender's encrypted email when working in the user interface 226. However, where for example the sender has not subscribed to service 214, or service 214 has not yet encrypted the sender's email address, no encrypted email may be included for the sender. In this instance, the sender's email address will be encrypted by the service 214 as explained hereinafter.

Those of skill in the art will appreciate a variety of other ways in which the private messaging sequence may be initiated. For example, instead of inviting a sender to generate an email via a hyperlink 220, the recipient may simply provide a sender with a proxy username email address (explained hereinafter) within the service 214 by any known communication scheme. The sender then may enter that proxy username email address in the "To" line of the sender's MUA email application program 202.

Once the sender has completed the body of their email, the sender may send the email to their mail exchange server 204. The exchange server 204 may query domain name server 206 to determine the location of service 214, which location the domain name server 206 returns in an MX listing to mail exchange server 204. Exchange server 204 may then forward the email to service 214.

Figure 4B:
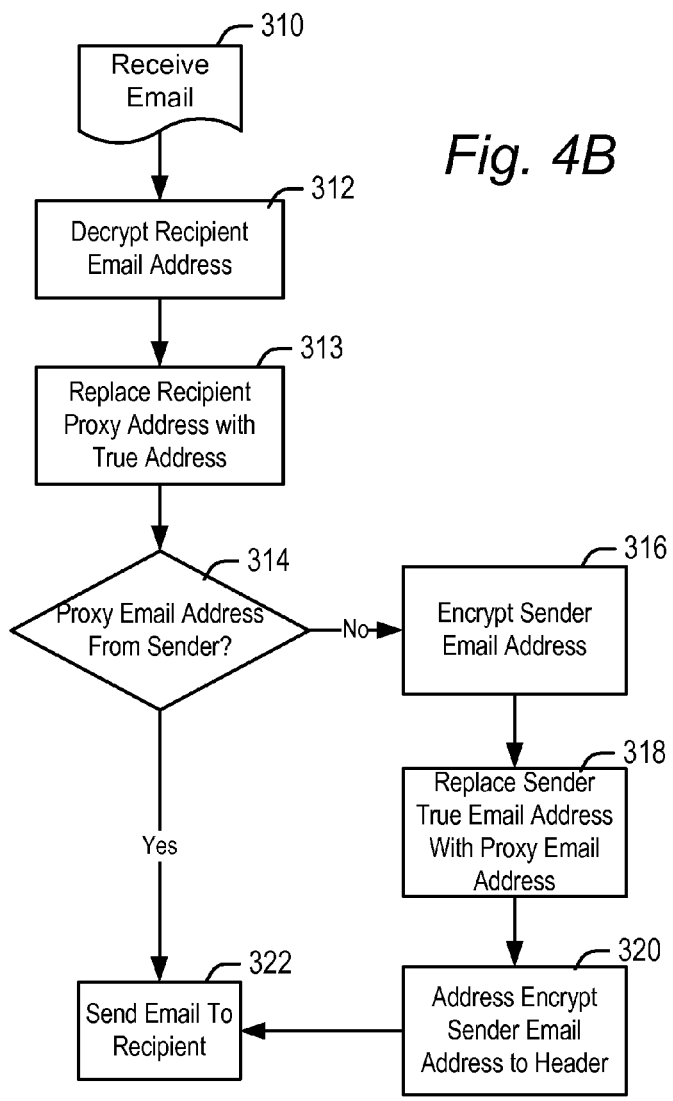
FIG. 4B is a flowchart showing the operation of the service according to an encryption embodiment of the present system.
Figure 6:
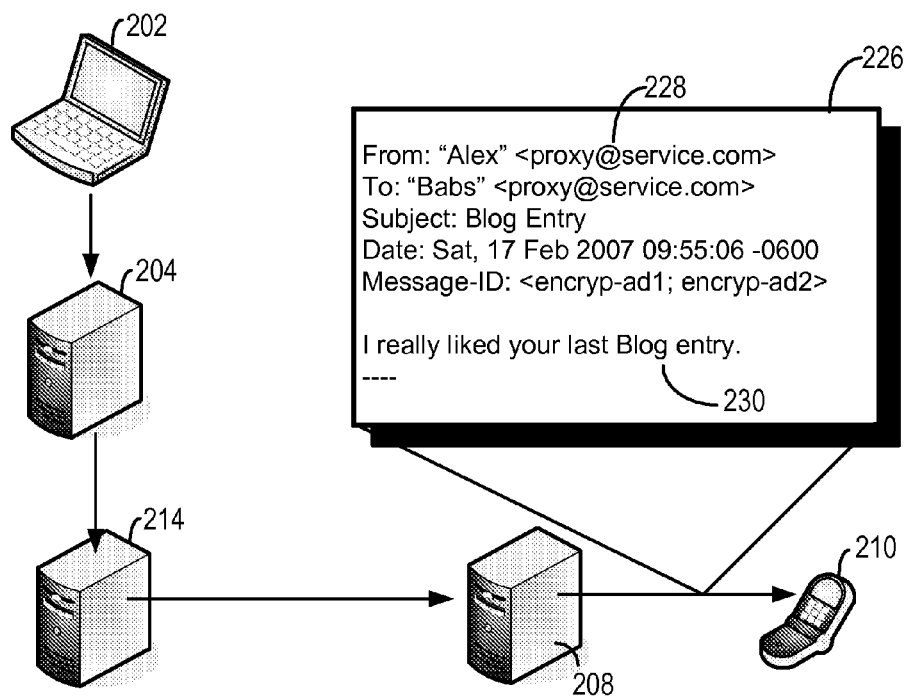
FIG. 6 is a block diagram of an email being routed from the service according to the present system to a recipient.

Referring now to FIG. 4B, upon receipt of an email in step 310, the service may decrypt the recipient's email address included in the header in a step 312. The service may then replace the proxy email address in the envelope recipient (RCPT TO as defined in RFC822) in step 313. This is the address to which the email is sent. In embodiments, the "To" line may remain addressed to the proxy email address as shown in FIG. 6. In an alternative embodiment, the "To" line may be changed to include the true email address of the recipient.

Prior to forwarding the email to the recipient, the service checks whether the "From" line includes a proxy or true email address of the sender in step 314. Where the "From" line includes the true sender email address, the service encrypts the sender's email address in a step 316. The service may then replace the sender's true email address with the service's proxy email address in step 318 and the sender's encrypted email address may be included in the header in step 320 as described above.

The service 214 may then send the email to the recipient in step 322. As described above, this may be accomplished by service 214 querying a domain name server (similar to domain name server 206) for the recipient's email exchange, and then forwarding the email to the recipient MUA 210 via the recipient's mail exchange server 208 as shown in FIG. 6. As indicated in FIG. 6, the email received by the recipient includes only an alias and a proxy email for the sender and the sender remains anonymous.

FIGS. 7 and 8 generally illustrate a method for creating a cryptographic email address for the sender and/or recipient for each email message. Such a system is described for example in U.S. patent application Ser. No. 10/965,058, entitled, "Validating Inbound Messages", which application is incorporated by reference herein in its entirety. In general, the messaging system builds cryptographic I.D. using a secret key and metadata from the outbound message. This key may be a form of symmetric or asymmetric cryptography and may be used to verify the presence of the cryptographic identifier in a received message.

As shown in FIG. 7, an encrypted email for the sender and/or recipient may include a local part [localpart], random data bytes [R], the encrypted identifier [MAC], one or more optimization "hints", including a recipient hint [RH] and a time interval hint [TH] and a version information [V]. In the following example, the cryptographic identifier includes at least the encrypted ID, which in the example consists of a message authentication code (MAC). A MAC is generally defined as an authentication tag derived by applying an authentication scheme, together with a secret key, to a message. Generally, MACs are computed and verified with the same key, making the encryption "symmetric." However, it should be understood that the encrypted ID in the above description can comprise any digital identifier, including a digital signature, verified using any encryption method, whether symmetric or asymmetric.

The local part and random data guarantee that the encrypted email addresses will be unique. It should be recognized that uniqueness may be ensured by means other than the use of random data. The hints are used to speed the characterization of the message, as described below. These hints provide the messaging system with a quick indication of whether or not to even check the encrypted identifier. In one embodiment, the recipient hint is the same as the sender's/recipient's account name with all the bytes XORed together. In one embodiment the time interval hint may be the time interval identifier XORed down to one byte.

It should be recognized that any method of reducing the byte count to create an optimization hint may be used, and the system is not limited to hash or XOR functions. The time interval identifier can be simply an identifier of a given day, or some other quantized representation of time. A range interval is checked when a reply is received and IDs therefore have a lifetime value. Use of the random number in the encrypted ID adds randomness to the hash. In one embodiment, the hash is a SHA-1 hash of this material. The version identifier is utilized so that the signature components may change while allowing the receiving system to adapt to such changes. In alternative embodiments, the hints and/or the version identifier are not required.

In FIG. 7, the encrypted ID is identified as a MAC. As shown in FIG. 8, the MAC is generated by using a hash of key material 416, the sending account name 408, (for example, user@domain.com,) a quantized time interval identifier 410, and random data 412. The key material 416 is fundamental to security. The sending account name is the sending user's email address for the message. To create the MAC, the random bytes (which in this example includes 5 random bytes) are concatenated. Next, the hash is XORed with itself down to five bytes, and then the single bytes of the two hints are appended. This sequence of twelve bytes is then HEX encoded to avoid any compatibility problems with non-alphanumeric characters, thereby forming a 24 byte string. Finally, the version identifier, which in one embodiment is a hex-encoded binary zero, will be appended. The various parts of an example cryptographic ID formed into a Message-ID are identified at 406 in FIG. 7. It is understood that other alternatives of creating an encrypted identifier may be used in accordance with the present system, including asymmetric encryption alternatives such as a PKI signature.

Referring now to FIG. 9, after a second party recipient receives a private message, the second party may choose to reply to the first party. The reply and any subsequent exchanges between the first and second parties may follow the above-described steps to mask the identities of the first and second parties. For example, as shown in FIG. 9, where a second party replies to the first party's email, the "From" and "To" lines may be switched. The service 214 may follow a convention for example where the first encrypted email listed in the header is that of the first party (original sender in this example), and the second encrypted email listed may be that of the second party. Accordingly, upon a reply, the encrypted emails in the header, "encrypt-ad1" and "encrypt-ad2," may also be switched.

Figure 10:
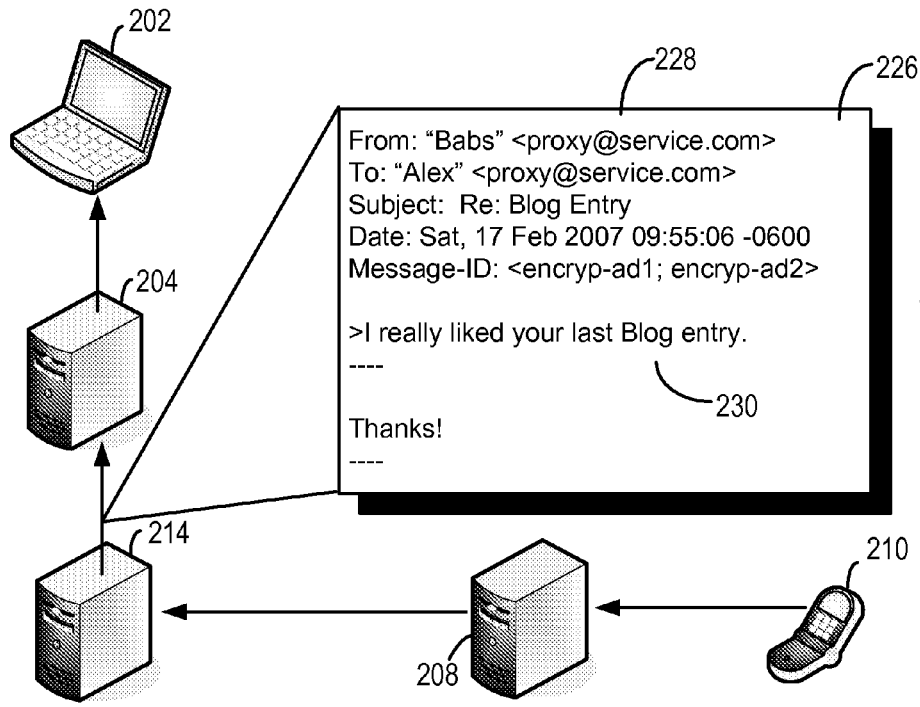
FIG. 10 is a block diagram of a reply email being routed from the service according to the present system back to the original sender.

The email will then be sent back to service 214 as indicated by the proxy email in the "To" line. Typically, a reply generated by a recipient's MUA will include the second party's true email address in the "From" line as shown in FIG. 9. As described above, in this instance, upon receipt at service 214, service 214 may replace the true email address in the "From" line with a proxy email address of the service. The service 214 may decrypt the encrypted email address for the first party email recipient (the original email sender in this example), and replace the "To" proxy email address with the true email address where the email is to be sent as shown in FIG. 10.

The email may then be sent using the first party's true email as described above. Again, the second party's true email address and identity is obscured in the mail sent from service 214. This process may be repeated as desired by the parties, subject to any metadata restrictions placed on the exchange as described hereinafter. The same process may also be used with multiple email recipients. As long as the email exchanges go through service 214, all participant identities will remain obscured.

Figure 11:
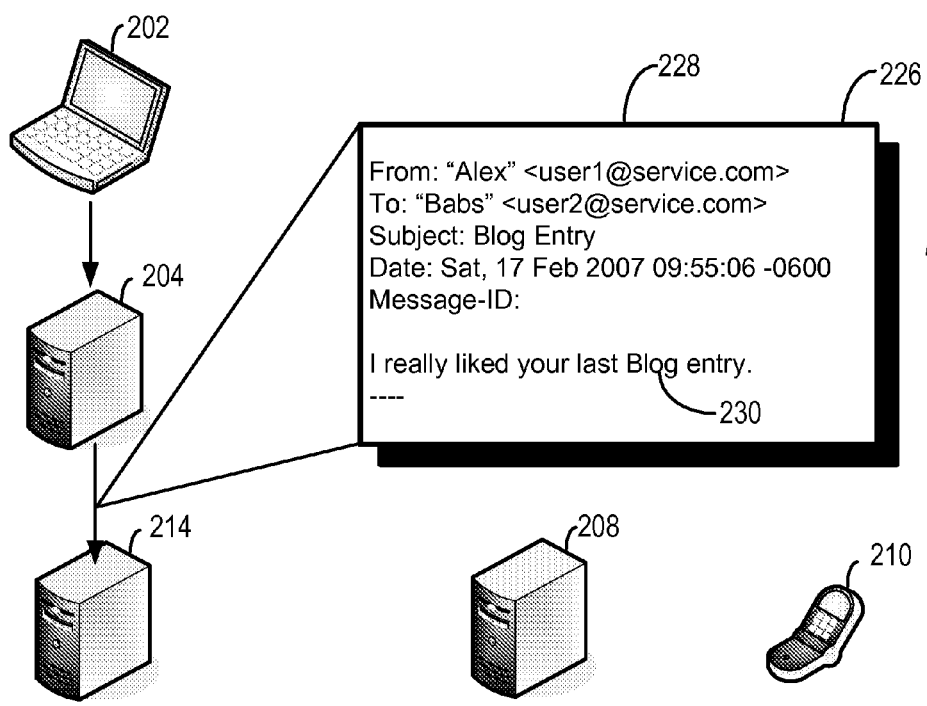
FIG. 11 is a block diagram of an email being routed from a sender to the service according to a look-up table embodiment of the present system.

As indicated above, in an alternative embodiment of the present system, instead of using encryption, service 214 may maintain a database look-up table correlating proxy email addresses to actual email addresses. Such an embodiment is now described with reference to FIGS. 11 through 13. In this embodiment, when a user subscribes to service 214, an alias and a proxy user name may be assigned to the subscriber and associated with a link initiating a private message session. The proxy user name assigned may be unique to the subscriber. Thereafter, when a sender initiates a private message session, such as by selecting a link from a recipient's web page or otherwise, the recipient's alias and proxy user name (i.e., user1@service.com) appear in the "To" line of the email as shown for example in FIG. 11. No encrypted email address need be generated or included in this embodiment.

The "From" line of the email may include an alias selected by the sender, "Alex" in this example. The alias is followed by an email address. The contents of the email address may vary depending on a few factors. As indicated above, the sender may initiate a private message from a website hosted by the service 214 or from a site not associated with the service 214. In embodiments where the sender is generating the private message while logged onto a web site hosted by service 214, the email address following the sender's alias may be a proxy user name assigned to the sender by the service 214. This is the example shown in FIG. 11. However, it may also happen that the sender has accepted an invitation to send a private message while on a web site other than service 214. In such an embodiment, the sender's true email address may appear in the "From" line.

Figures 12, 13:
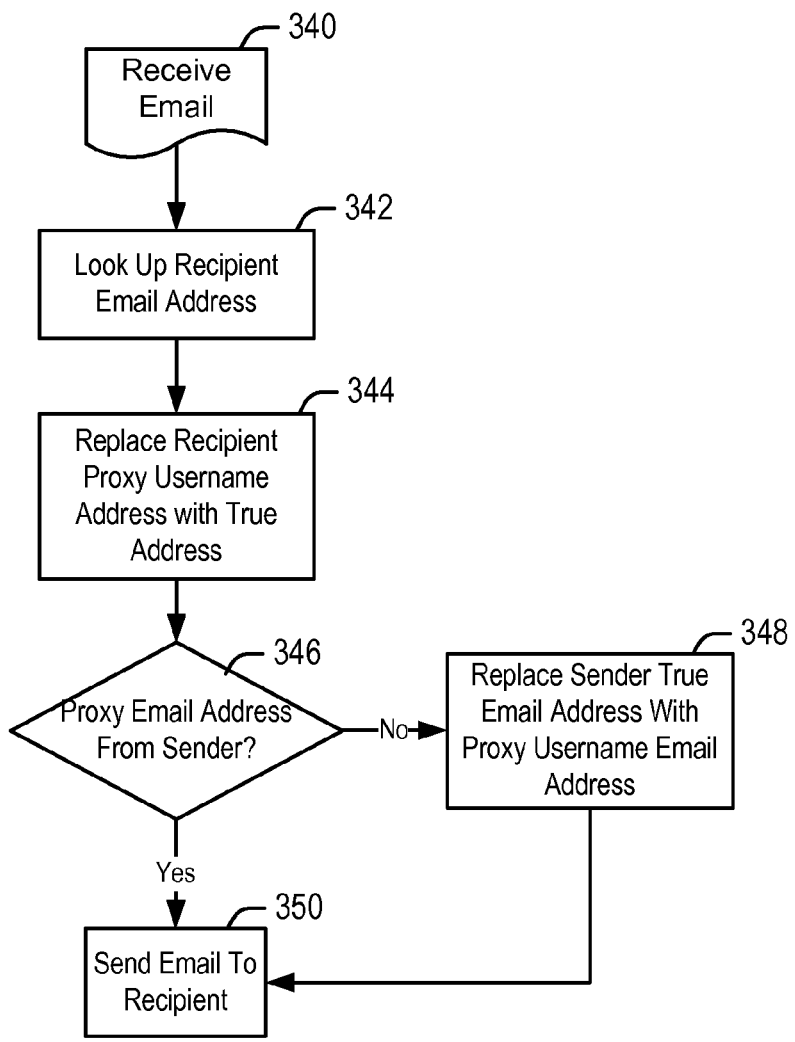
FIG. 12 is a flowchart showing the operation of the service according to a look-up table embodiment of the present system.
FIG. 13 is an example of a look-up table used by the service according to an embodiment of the present system.

Referring to the flowchart of FIG. 12, once received at service 214 in a step 340, the recipient's proxy user name may be used to look up the recipient's true email address in step 342. A look-up table 260 such as for example shown in FIG. 13 may be used for this purpose. Table 260 may be stored in memory accessible to service 214. Table 260 may include a unique proxy user name 262 for each user, and the user's associated true email address 264. Those of skill in the art will appreciate a wide variety of schemes for storing a proxy user name email address in association with a true user email address. Once the recipient's true user name is identified from table 260, the service 214 may then replace the proxy username email address (in the email envelope, and possibly in the "To" line) with the true email address of the recipient in step 344. The true address is then used as the address to which the email is sent.

Prior to forwarding the email to the recipient, the service checks whether the "From" line includes a proxy username address or true email address of the sender in step 346. Where the "From" line includes the true sender email address, the service replaces that with the sender's proxy username email address in a step 348 as described above. Other headers and the body of the email may also be checked in case the user's real address appears elsewhere in the email. If found elsewhere, the user's true email is either removed or replaced with the proxy email. The service 214 may then send the email to the recipient in step 350.

In a further embodiment of the present system, a subscriber to service 214 may set certain preferences which are then reflected in the metadata associated with a header in an email. Such preferences may include preventing emails from one or more individuals, limiting the length of time within which a sender must contact the recipient, limiting the number of emails which may be sent from one, some or all users to the recipient, and limiting the type of content which may be included in the body of an email to the recipient. This metadata may be coded into the header of an email, for example in the message ID, and used by service 214 to implement the recipient's preferences. In a similar manner, a sender may create certain preferences with service 214 which preferences are reflected in the metadata within the header of a message generated from and/or to the sender.

There are several methods for implementing the metadata restrictions. For example, where the original recipient no longer wants to hear from the sender or vice-versa, the conversation/thread may be revoked. This could be done by notifying the service 214 to cease all future communications for that thread. One of the parties may further request that the service prevent another party from ever communicating with the recipient through the obfuscation.

There may be a metadata restriction where a party revokes their obfuscated email address. After an initial exchange or at some point in time, a party may want to remove their masked address so that no one can communicate with them anymore. This would mean removing the mapping from the datastore look-up table. In the case of encrypted email addresses in the header, this embodiment could maintain revocation information in the service 214, checking for emails to that address and, if found, preventing their transmission. Other metadata restrictions are contemplated.

In the embodiments described above, service 214 is a computing system environment which is separate from the sender's mail exchange server and the recipient's mail exchange server. In a further embodiment of the present system, it is understood that service 214 may be incorporated into one or both of the sender's and recipient's email exchange servers. In embodiments, the sender and recipient may share the same mail exchange server. This may be one example where service 214 may be incorporated into the common mail exchange server.

The foregoing detailed description of the system has been presented for purposes of illustration and description. It is not intended to be exhaustive or to limit the system to the precise form disclosed. Many modifications and variations are possible in light of the above teaching. The described embodiments were chosen in order to best explain the principles of the system and its practical application to thereby enable others skilled in the art to best utilize the system in various embodiments and with various modifications as are suited to the particular use contemplated. It is intended that the scope of the system be defined by the claims appended hereto.

What is claimed is:

1. A computer implemented method of transmitting an electronic message from a first party to a second party who remain anonymous to each other during the transmission, comprising the steps of:
   (a) transmitting the message from the first party to a service, the message including proxy addresses for the first and second parties;
   (b) encrypting the address of the first party and a second party;
   (c) including the encrypted address of the first and the second party in a header of the message in addition to the proxy addresses;
   (d) decrypting the encrypted address of the second party by the service;
   (e) forwarding the message to the second party with the first party address encrypted; and
   (k) sending metadata in the message header between the first and second parties, the metadata includes an indication of whether one or more of a subgroup of less than all recipients have blocked messages from the first party, and whether the second party is in the subgroup that have blocked messages from the first party.

2. A method as recited in claim 1, further comprising transmitting a reply from the second party to the first party, the method further comprising the steps of:
   (f) transmitting the message from the second party to the service;
   (g) encrypting the address of the second party;
   (h) including the encrypted address of the first and the second party in a header of the message;
   (i) decrypting the encrypted address of the first party by the service; and (j) forwarding the message to the first party with the second party address encrypted.

3. A method as recited in claim 1, said step (c) of including the encrypted address of the first and second party in a header of the message comprises the step of including the encrypted address of the first and/or second party in the message ID of the header.

4. A method as recited in claim 1, said step (c) of including the encrypted address of the first and second party in a header of the message comprises the step of including the encrypted address of the first and/or second party in a "To" line of the header.

5. A computer implemented method of transmitting an electronic message from a first party to a second party who remain anonymous to each other during the transmission, comprising the steps of:
 (a) transmitting the message from the first party to a service;
 (b) changing the message address of the first party to a proxy address of the service;
 (c) including the proxy message address of the first party in a header of the message;
 (d) determining whether the second party has placed a block on receiving messages from the first party; and
 (e) forwarding the message to the second party with first party identified only by the proxy address for the first party if it is determined in said step (d) that the second party has not blocked emails from the first party.

6. A method as recited in claim 5, further comprising transmitting a reply from the second party to the first party, the method further comprising the steps of:
 (f) transmitting the message from the second party to the service;
 (g) changing the address of the second party to a proxy address of the service;
 (h) including the proxy address the second party in a header of the message; and
 (i) forwarding the message back to the first party with second party identified only by the proxy address for the first party.

7. A method as recited in claim 5, further comprising the step (j) of creating a restriction implemented by the service relating to transmission of messages from the first and/or second parties.

8. A method as recited in claim 7, wherein said step (j) of creating a restriction comprises the step of restricting who may reply to the message.

9. A method as recited in claim 7, wherein said step (j) of creating a restriction comprises the step of restricting how many replies may be sent between the first and second parties.

10. A method as recited in claim 7, wherein said step (j) of creating a restriction comprises the step of limiting the length of time within which the first or second party must reply to the received message.

11. A method as recited in claim 5, wherein said step (b) of changing the address of the first party to a proxy address of the service comprises the step of looking up the first party address in a database, finding the associated proxy username address for the first party, and including the proxy username address for the party in the header of the message.

12. A computer implemented method of transmitting an electronic message from a first party to a second party who remain anonymous to each other during the transmission, comprising the steps of:
 (a) receiving, by a first party to a service, a message sent by a second party to the service, the first party being one of a plurality of recipients of the message sent by the second party;
 (b) responding by the first party to the message from the second party to the service;
 (c) obscuring a true address of the first and second parties;
 (d) forwarding the message to the second party with first and second parties' true identities obscured; and
 (e) implementing a restriction stored in the service, the restriction including an indication of whether a subgroup of the plurality of recipients have blocked messages from the first party and the restriction including an indication of whether the second party is in the subgroup that have blocked the content of the message from being sent.

13. A method as recited in claim 12, said step (e) of implementing a restriction stored in the service further comprising the step of restricting who and/or how often a party may reply to the message.

14. A method as recited in claim 12, said step (e) of implementing a restriction stored in the service further comprising the step of restricting a time period within which the first and/or second party may reply to a message.

15. A method as recited in claim 12, said step (d) of forwarding the message to the first or second party comprising the step of decrypting a true address of the first or second party included in the header of the message and forwarding the message to the first or second party using the decrypted address.

16. A method as recited in claim 12, said step (d) of forwarding the message to the first or second party comprising the step of looking up a true email address from a database of stored obscured address/true address pairs and forwarding the message to the first or second party using the decrypted address.

* * * * *